United States Patent [19]

Blinow et al.

[11] 4,007,468
[45] Feb. 8, 1977

[54] TRIM CONTROL APPARATUS FOR PHOTOGRAPHIC EXPOSURE CONTROL SYSTEM

[75] Inventors: Igor Blinow, Millis; Bruce K. Johnson, Andover; George D. Whiteside, Lexington, all of Mass.

[73] Assignee: Polaroid Corporation, Cambridge, Mass.

[22] Filed: Mar. 3, 1975

[21] Appl. No.: 554,927

[52] U.S. Cl. .................................. 354/59; 354/26; 354/30; 354/42; 354/47

[51] Int. Cl.$^2$ ......................................... G03B 7/00

[58] Field of Search ............. 354/23 R, 26, 27, 28, 354/29, 30, 42, 47, 59, 230

[56] References Cited

UNITED STATES PATENTS

| | | | |
|---|---|---|---|
| 3,002,435 | 10/1961 | Briskin et al. | 354/42 |
| 3,315,579 | 4/1967 | Land | 354/23 |
| 3,593,639 | 7/1971 | Starp | 354/42 |
| 3,832,722 | 8/1974 | Douglas | 354/59 |
| 3,896,458 | 7/1975 | Johnson et al. | 354/59 |

*Primary Examiner*—Russell E. Adams, Jr.
*Attorney, Agent, or Firm*—Edward S. Roman

[57] ABSTRACT

An optical trim mechanism is provided for embodiment in the exposure control system of a photographic camera apparatus wherein the output response of the exposure control system is determined by both the photographic scene light reaching the photographic camera as well as the focused distance from the photographic camera to the subject to be photographed. The trim mechanism provides the photographer with a degree of overriding personal control through which he may simultaneously vary the amount of scene light reaching the exposure control system while at the same time varying the output response of the exposure control system as determined by the focused distance from camera to subject.

20 Claims, 10 Drawing Figures

TRIM CONTROL APPARATUS FOR PHOTOGRAPHIC EXPOSURE CONTROL SYSTEM

BACKGROUND OF THE INVENTION

1. Field of the Invention

This invention relates generally to an optical trim mechanism for a photographic apparatus and more particularly to an optical trim mechanism for simultaneously influencing the output response of both a light responsive exposure control system and a follow focus system within a photographic apparatus.

2. Description of the Prior Art

The exposure system of a photographic camera when operated in conjunction with a flash or transient illumination is ordinarily adjusted as a function of the levels of illumination anticipated at the scene being photographed. An evaluation based on the anticipated level of illumination may be made based upon an application of the inverse square law of light energy propagation which may additionally be weighted to anticipate spurious room reflections. Under this law, the light energy available from a given source is considered to vary inversely with the square of the distance from that source. Accordingly, to make an appropriate exposure mechanism adjustment for flash photography, source to subject distance is derived and the value of this distance is utilized to compute an appropriate exposure value or illuminational factor.

In some camera designs, exposure control adjustment for flash operation is effected automatically by incorporating within the apparatus what is termed as a follow focus system. With a follow focus arrangement, aperture adjustment or flash illumination output control is mechanically coupled with the range finding or focusing system of a camera. In effect, a follow focus control represents a second exposure control system for a camera. As such, its presence necessarily contributes to the size and complexity of a camera.

A follow focus control system for an exposure control system is described in a patent entitled "Focus Responsive Exposure Control System" by V. K. Eloranta and E. K. Shenk, U.S. Pat. No. 3,750,543, filed Apr. 19, 1971, and assigned in common herewith. The patent describes a second flash mode control system wherein an electromagnetic device, such as a solenoid, is selectively maneuvered and energized to extend its plunger to arrest position of exposure aperture blades in accordance with focal setting. A complete follow focus system is described in a U.S. patent entitled "Apparatus and System for Flash Photography" by Lawrence M. Dougles, filed Mar. 15, 1973, U.S. Pat. No. 3,832,722 and assigned in common herewith. This system achieves a requisite compactness to meet the overall camera design described in U.S. Pat. No. 3,714,879 and incorporates means for selective use of the follow focus system exclusively during the flash illuminated exposure mode of operation. The above follow focus system additionally provides a trim function to accomodate for slight variations in the sensitometric characteristic of the film as well as to insert a modicum of personal or overriding control over the automated system. The trim control has only one control element for operation in this manner substantially reducing the possibility that a camera operator may become confused or overlook a requirement for providing a trim control for that mode of operation for which he is currently using.

In photographic apparatus of the type having light responsive exposure control systems including light integrating arrangements embodying photocells, the trim control may also serve to selectively position a plurality of varying light transmissive sections over the light sensing photocell of the light responsive exposure control system. Thus any exposure value alteration inserted as a trim from the trim control is simultaneously transmitted to the follow focus system as well as into the light detecting photocell. This arrangement has been utilized in systems of the so-called hybrid type as disclosed in an application for U.S. patent entitled "Automatic Exposure Control System" by G. D. Whiteside and B. K. Johnson, filed Aug. 5, 1974, and assigned in common herewith, where follow focus and light detecting means are used in cooperation with each other during the flashmode of operation.

Therefore, it is a primary object of this invention to provide a simple and economical trim control assembly for use with photographic apparatus embodying both light responsive exposure control systems as well as follow focus exposure control systems.

It is also an object of this invention to provide a single and economical trim control assembly for use with photographic apparatus of the single lens reflux type embodying a new and improved follow focus system.

It is an additional object of this invention to provide a trim control assembly wherein the individual components may be economically manufactured by molding.

It is a further object of this invention to provide a trim control assembly which may be readily assembled with respect to a photographic apparatus without the use of extraneous tools or connectors.

Other objects of the invention will in part be obvious and will in part appear hereinafter. The invention accordingly comprises the mechanism and system possessing the construction, combination of elements and arrangement of parts which are exemplified in the following detailed disclosure.

SUMMARY OF THE INVENTION

A trim apparatus is provided for a photographic apparatus of the type having a light responsive exposure control system including scene light sensing means together with a follow focus system responsive to the displacement of a link member. The trim apparatus includes a mounting plate fixedly stationed with respect to the mounting plate together with a manually adjustable trim bezel disposed for rotation with respect to the mounting plate. There is also included a trim member which includes a light transmissive portion of varying light transmissive characteristics movable in scene light intercepting relation with respect to the scene light sensing means. The trim member also connects to the link member in order to move the link member in correspondence with the light transmissive portion. The trim member is disposed for rotation with respect to the mounting plate and includes an arcuate portion in drivable engagement by a circumferential portion of the manually adjustable member such that clockwise rotation of the adjustable member results in a corresponding clockwise rotation of the trim member while counterclockwise rotation of the adjustable member results in a corresponding counterclockwise rotation of the trim member. The trim member, therefore, operates to simultaneously displace the link member in order to trim the response of the follow focus system while at the same time varying the amount of scene light reaching the light sensing means in order to effect a corresponding trim of the response of the exposure control system with respect to a select amount of scene light.

BRIEF DESCRIPTION OF THE DRAWINGS

The novel features that are considered characteristic of the invention are set forth with particularity in the appended claims. The invention itself, however, both as to its organization and its method of operation, together with other objects and advantages thereof, will be best understood from the following description of the illustrated embodiment or when read in connection with the accompanying drawings or when like members have been employed in the different figures to note the same parts and wherein:

DESCRIPTION OF THE PREFERRED EMBODIMENT

Figure 1:
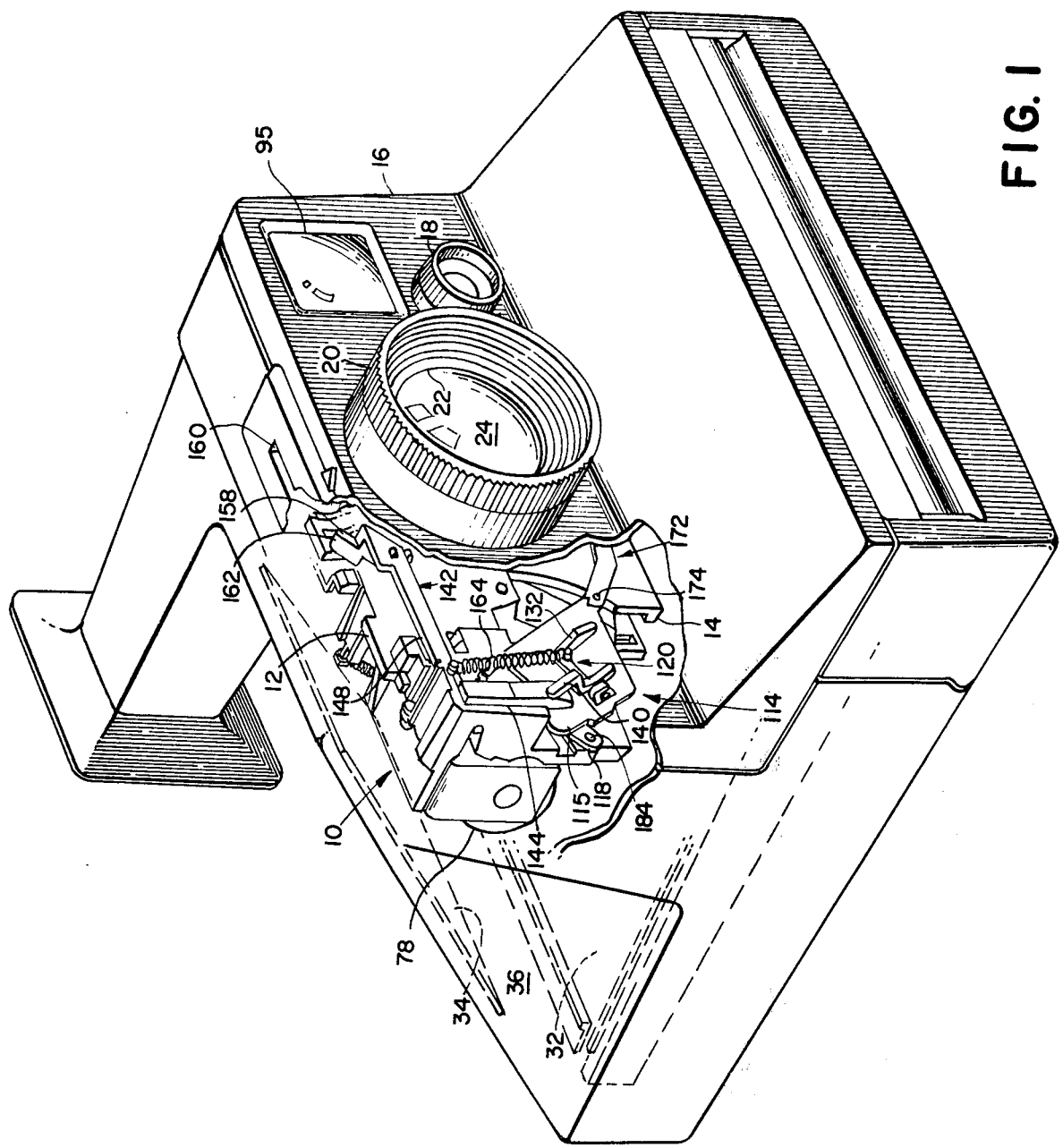
FIG. 1 is a perspective view of a photographic camera embodying the trim assembly of this invention in a camera exposure control system.

Referring now to FIG. 1, it can be seen that the exposure control system of this invention is disposed within an exposure housing 10 comprising a baseblock casting 12 selectively machined to support the components of the exposure mechanism. Surrounding the front and top of the casting 12 there may be provided a cover 16 which includes openings through which protrude manually adjustable trim and focus bezels shown at 18 and 20 respectively. Intermediate the baseblock casting 12 and the front cover 16 there is provided a lens housing casting 14, the central portion of which includes a light entering exposure opening 22 which defines the maximum available exposure aperture for this system.

An objective or taking lens 24 is provided in overlying relation to the light entering opening 22 wherein the objective lens 24 may comprise a plurality of elements retained in predetermined spaced relation by a cylindrical lens mount assembly 28 which is externally threaded for toothed engagement with the internally threaded focus bezel 20. Bezel 20 is made rotatable with respect to the lens housing casting 14 and front cover 16 to provide translational movement of the elements of lens 24 along a central optical axis 30 of the optical path of the housing 10. As is readily apparent, the center optical axis 30 of the optical path is illustrated as being normal to the plane of the drawing in FIGS. 2-4. The rotation of focus bezel 20 may be carried out by manual rotation to provide displacement of the elements of objective lens 24 for focusing of image carrying rays through the light entering exposure opening 22 to a rearwardly positioned film plane 32 by way of a reflecting mirror 34 when the system is embodied in a suitable film exposure chamber 36. Immediately behind the objective lens 24 and light entering exposure opening 22 there are supported two overlapping shutter blade elements 38 and 40 which will be subsequently described in greater detail herein. Extending from the top of the housing 10 is a shutter release button (not shown), the depression of which causes the commencement of an exposure cycle.

A pair of scene light admitting primary apertures 42 and 44 are provided respectively in the blade elements 38 and 40 to collectively define a progressive variation of effective aperture openings in accordance with longitudinal and lateral displacement of one blade element with respect to the other blade element in a manner fully described in a U.S. Pat. application entitled "Camera With Pivoting Blades" by George D. Whiteside, filed July 2, 1974, and assigned in common herewith. The apertures 42 and 44 are selectively shaped so as to overlap the light entering exposure opening 22 thereby defining a gradually varying effective aperture size as a function of the position of blades 38 and 40. Each of the blades, 38 and 40, may additionally be configured to have corresponding photocell sweep secondary apertures shown respectively at 46 and 48. Secondary apertures 46 and 48 may be configured in correspondence with the shapes of scene light admitting primary aperture 42 and 44. As is readily apparent, the secondary apertures 46 and 48 also move in correspondence with the primary apertures 42 and 44 to define a small secondary effective aperture for admitting the passage of light from the scene being photographed to a light detecting station shown generally at 49. The light detecting station 49 includes a light sensitive circuit having both a photocell 270 and control circuit 272 which collectively operate to terminate an exposure interval in a well known manner as a function of the amount of light received through the secondary effective aperture as defined by the overlapping photocell sweep apertures 46 and 48. An exposure control mechanism embodying a light detecting station of the above described type is described in more detail and claimed in a U.S. patent entitled "Exposure Control System" by V. K. Eloranta, U.S. Pat. No. 3,641,889.

Projecting from the baseblock casting 12 at a location spaced laterally apart from the light entering exposure opening 22 is a pivot pin or stud 50 which pivotally and translatively engages elongate slots 52 and 54 formed in respective shutter blade elements 38 and 40. Pin 50 may be integrally formed with the baseblock casting 12 and blade elements 38 and 40 may be retained in engaging relation with respect to the pin 50 by any suitable means such as peening over the outside end of pin 50.

The opposite ends of the blade elements 38 and 40 respectively include extended portions which pivotally connect to a walking beam 56. The walking beam 56 in turn is disposed for rotation about a laterally extending stud 60 which journals a centrally disposed elongated integral shaft 58 extending from the back side of the walking beam 56. The stud 60 protrudes laterally from an integral extension 62 of the baseblock casting 12. A centrally disposed integral pin 64 extends from the opposing forward side of the walking beam 56 and is in turn journaled for rotation by a bushing 66 in the lens housing casting 14.

In the preferred mode, the walking beam 56 is pivotally connected at its distal ends to the shutter blade elements 38 and 40 by respective pin members 67 and 68 which extend from the walking beam 56. Pin members 67 and 68 are preferably circular in cross section and extend through respective circular openings 70 and 72 in respective blade elements 38 and 40 so as to slidably engage respective arcuate slots or tracks 74 and 76 which may be integrally formed within the baseblock casting 12. The arcuate tracks 74 and 76 operate to prohibit disengagement of the blade elements 38 and 40 from their respective pin members 67 and 68 during exposure control system operation.

A tractive electromagnetic device in the form of a solenoid 78 is employed to displace the shutter blades 38 and 40 with respect to each other and the casting 12. A solenoid 78 may be of conventional design carrying an internally disposed cylindrical plunger unit 80 which retracts inwardly into the body of the solenoid upon energization thereof. The solenoid plunger unit 80 is affixed to the walking beam 56 by means of a guideway 82 at the outward end of the plunger 80 which guideway slidably engages a pivot pin 84 laterally extending from an integral radial crank arm portion 86 of the elongated shaft 58. In this manner longitudinal displacement of the plunger unit 80 will operate to rotate the walking beam about the lateral stud 60 and bushing 66 so as to appropriately displace the shutter blade elements 38 and 40. The blade elements 38 and 40 are continuously urged into positions defining the largest effective aperture over the light entry exposure opening 22 by a biasing tension spring 88. The movable end of spring 88 engages a slot 90 in a second integral radial arm portion 92 extending outwardly from the elongated shaft 58 while the stationary end of spring 88 is grounded by connection to a pin 93 extending from the baseblock casting 12. With the spring connection herein described, the exposure control mechanism of this invention is biased into a normally opened orientation and the shutter blade elements 38 and 40 are drawn to their closed position only while solenoid 78 is energized. Consequently, energization of the solenoid 78 prevents the shutter blades 38 and 40 from moving toward their maximum aperture opening under the urging of spring 80. However, as should be readily understood, the exposure control mechanism of this invention would be equally applicable to photographic systems where the blades 38 and 40 are spring biased in a normally closed position.

The exposure control system is herein described in relation to a photographic camera of the non-single lens reflex type although the intended scope of the invention is by no means so limited and cameras of the well known reflux type as described in U.S. Pat. No. 3,672,281 entitled "Reflex Camera" by E. H. Land may be equally suitable for embodying the exposure control system of this invention.

The following photographic cycle of operation is described in regard to a camera of the non-single lens reflex type wherein the viewfinder 95 does not have a through the lens viewing and focusing capability. The ambient photographic cycle is commenced with the depression of a start button (not shown) whereupon tension spring 88 operates to rotate walking beam 56 in a clockwise direction as viewed from the front of the exposure housing 16 thus moving shutter blade elements 38 and 40 in directions which operate to progressively enlarge the effective aperture over the light entering exposure opening 22. As is readily apparent, rotation of walking beam 56 effects simultaneous translation and rotation of shutter blade elements 38 and 40 about pivot pin 50. Simultaneously, photocell sweep secondary apertures 46 and 48 define a corresponding progressively enlarging aperture opening over the photocell. When an appropriate amount of light is received to trigger the light sensitive control circuit, solenoid 78 is again energized to rapidly close blade elements 38 and 40 thereby terminating an exposure control interval. The latter energization of solenoid 78 must continue until such a time as a latch 94 is moved into lateral engagement with an integral cam portion 96 of the walking beam 56 in a manner as is more fully described in an application for U.S. Patent, Ser. No. 554,777 by George Whiteside and Bruce Johnson and David Van Allen, filed concurrently herewith in common assignment. In the preferred mode, the integral cam portion 96 defines an elongated planar cam surface, the edge portion of which is shown at 98.

With the ambient operation thus described, relative aperture as well as exposure interval are selectively weighted for any given level of scene brightness so as to optimize the selection of exposure interval and aperture. To trim this ambient performance of the exposure system, an optical trim wedge 100 having selectively variable transmissive properties therethrough, may be pivotally manipulated before the photocell 270 in the manner as described and claimed by this invention. Adjustment of the position of trim wedge 100 is carried out by manually rotating the trim bezel 18 with respect to a trim mounting plate 102 which is fastened to the lens housing casting 14 by means subsequently described in substantial detail. The optical trim wedge 100 is disposed for rotation with respect to the trim mounting plate 102 by an interconnecting pivot pin 103 and maintained in closely spaced guided relation with respect to the plate 102 by two overlying guide members shown generally at 264 and 266. The optical wedge 100 additionally includes an arcuate toothed portion 110 which is drivingly engaged by a peripheral toothed portion 108 around the outside edge of the trim bezel 18 such that manual rotation of the trim bezel 18 in turn operates to rotate the trim wedge 100 about pivot pin 103. The trim bezel 18 is of hollow cylindrical form so that rotation of the trim wedge 100 provides for a corresponding rotation of the light transmissive portion thereof across the open end of the trim bezel 18. Accordingly, manipulation of trim bezel 18 will selectively move the optical trim wedge 100 across the photocell 270 to adjust the amount of light permitted to enter the photocell 270 through the photocell sweep secondary apertures 46 and 48. The variable light transmissive properties of the optical trim wedge 100 may be provided by a plurality of sections 112, each of which exhibits a different light transmissive property therethrough.

Figure 10:
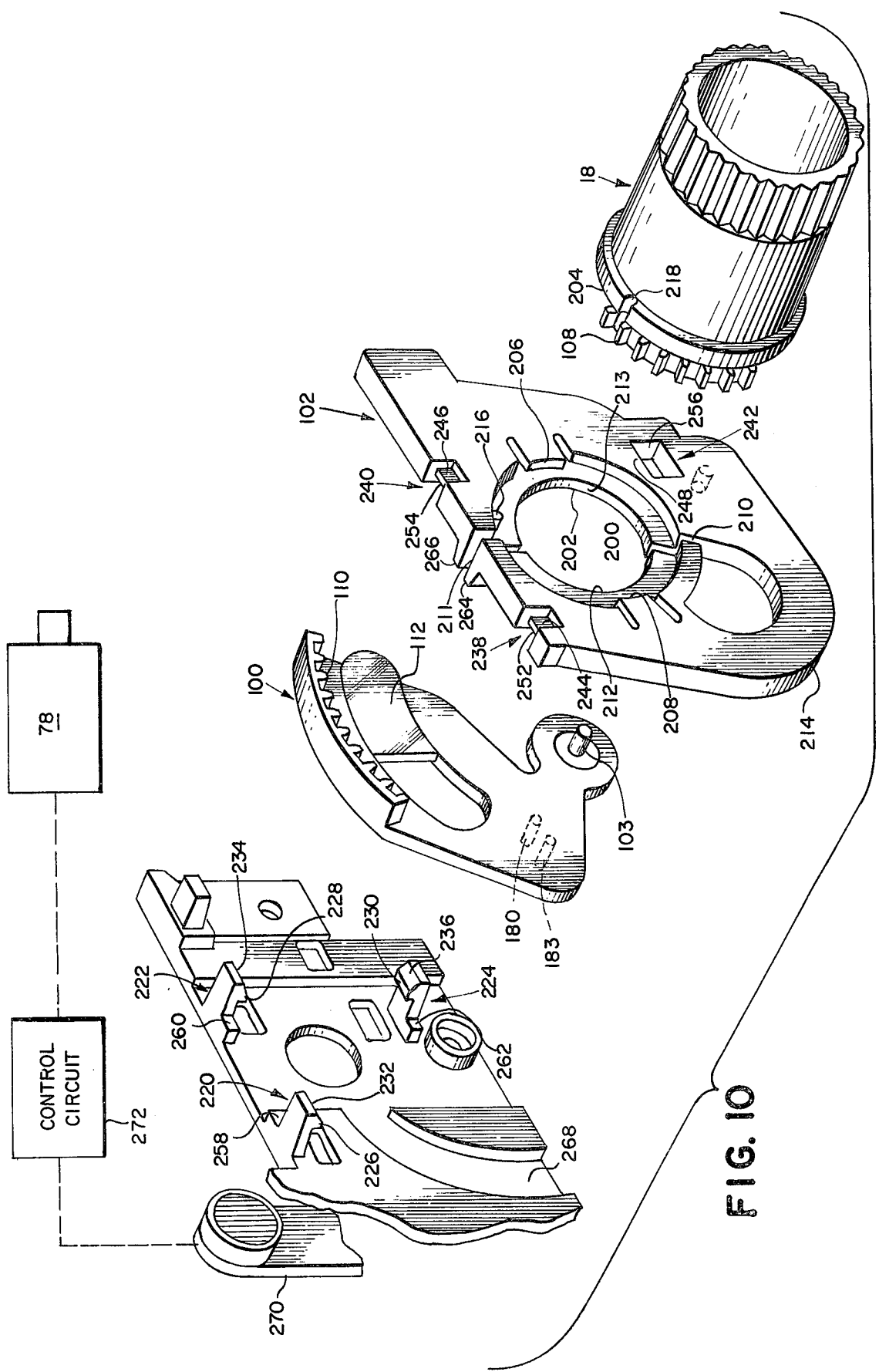
FIG. 10 is an exploded perspective view of the trim assembly of FIG. 1.

The trim mounting plate 102 includes a hole therethrough as shown at 200 for receipt of the trim bezel 18. The trim bezel 18 may therefore be rotated with respect to the mounting plate 102 and includes a peripheral flange 204 extending outwardly therefrom as shown in FIG. 10 which flange is snapped into abutment against a circumferential flange 202 extending inwardly from the trim mounting plate hole 200. The opposing side of the peripheral flange 204 is maintained in axial position by a pair of overlapping dogear flanges 206, 208. The trim bezel 18 is snapped in place with respect to the mounting plate 102 by spreading apart the mounting plate hole 200 which is circumferentially cut by gaps 210, 211 to define two opposed arcuate portions 212, 213. The arcuate portions 212, 213 are biased for movement toward each other by a resilient interconnection portion 214 thereby increasing the frictional forces between the mounting plate 102 and trim bezel 18 in a manner operating to brake the rotation of the trim bezel 18 and thereby discourage the undesirable or accidental rotation of the trim bezel. The mounting plate hole 200 may also include a detent 216 for engagement with a corresponding slot 218 in the trim bezel peripheral flange 218 in order to permit ready identification of a select position of the trim bezel 18 which corresponds to a predetermined output condition for the exposure control system as will be more fully described.

The lens housing casting 14 includes three integral elongated resilient prongs or tangs 220, 222 and 224 extending forwardly therefrom into engagement with respective receiving slots or grooves 238, 240 and 242 in the trim mounting plate 102. The prongs 220, 222 and 224, respectively, include upstanding stud portions 226, 228 and 230 extending from the outward tips thereof with the leading edge of each stud portion being preferably bevelled as shown at 232, 234 and 236. The receiving slots 238, 240 and 242 also respectively include bevelled leading edges 252, 254 and 256 for respective engagement with the bevelled leading edges 232, 234, and 236 of the stud portions 226, 228 and 230 upon their insertion into respective receiving slots. The stud portions and their respective prong members are thus deflected in this manner to permit full insertion of the prong members within the respective receiving slots. As is readily apparent, the receiving slots 238, 240 and 242 extend from respective transverse end wall portions 244, 246 and 248 which operate to engage the respective sides of the stud portions 226, 228 and 230 upon full insertion of the resilient prong members 220, 222 and 224 within the respective receiving slots 238, 240 and 242. Thus, the unintentional withdrawal of the prong members 220, 222 and 224 is prohibited, however, the prong members 220, 222, and 224 may be intentionally withdrawn by bending the outside tips thereof in a manner serving to disengage the sides of the stud portions 226, 228 and 230 from engagement with the transverse end wall portions 244, 246, and 248. It should be further appreciated that the prongs 220, 222 and 224 are also notched to define respective transverse edge wall portions 258, 260 and 262 spaced apart from the outward tips thereof so as to engage the trim mounting plate 102 in a manner limiting the insertion of the prong members 220, 222 and 224 into their respective receiving slots 238, 240 and 242. In this manner the trim mounting plate 102 may be quickly and simply fastened in fixed relation with respect to the lens housing casting 14 without the use of any extraneous fastening tools or connectors.

A so-called "follow focus" interceptor is provided for operation in conjunction with the focusing components of the camera during the flash mode of operation. The follow focus system described herein has been independently disclosed and claimed in U.S. Pat. No. 3,972,057 entitled "Improved Follow Focus System For Camera Apparatus" by George D. Whiteside, and is therefore now discussed only to provide a better understanding of the instant invention. The backward side of the lens mount assembly 28 drivingly connects to a radial face cam 168 in a manner such that the radial face cam moves in correspondence with manual adjustment of the focus bezel 20. As previously discussed, focus bezel 20 is rotatable to provide objective lens focusing and thus the rotational orientation of focusing bezel 20 continuously corresponds with the focus setting of the lens system.

The integral cam portion 96 of walking beam 56 moves through a predetermined arcuate locus of travel as shutter blade elements 38 and 40 are driven either under the biasing spring 88 or from the plunger unit 80 of solenoid 78. For follow focus operation, the movement of walking beam 56 along its locus of travel establishing increasingly widening apertures is selectively arrested to establish a predetermined focus responsive apertural value. Motion arrest is provided by way of an interceptor crank assembly 114 which includes interalia, an interceptor pin 134 selectively positionable within the above noted locus of travel so as to contact the cam surface 98 of the integral cam portion 96 to halt the exposure mechanism as it moves under the bias of tension spring 88. Relative positioning of the interceptor crank assembly 114 within the locus of travel of integral cam portion 96 is provided by virtue of a pivotal connection between a crank arm plate 115 and an adjusting bar 118 at pivot point 116.

The interceptor pin 134 is operatively associated with the crank arm plate 115 through an interceptor flapper linkage 120 which includes an elongated center portion 122 disposed for rotation relative to the crank arm plate 115 by a pair of integral pins 124 and 126 extending from the opposed ends of the elongated center portion 122. Pins 124 and 126 are respectively disposed for rotation with respect to the crank arm plate 115 by a pair of spaced apart bearing surfaces shown generally at 128 and 130 which extend from the crank arm plate 115. The interceptor flapper linkage 120 additionally includes an integral arm portion 132 extending downwardly from the elongated center portion 122 into fixed connection with the interceptor pin 134. As may be more readily seen by referring to FIG. 5, the interceptor pin 134 includes an arcuate edge surface 136 generated about a center axis coincident with a center axis of rotation for pins 124 and 126 thus making the positioning of interceptor pin 134 within the locus of travel of walking beam 56 insensitive to the exact number of degrees thru which the flapper linkage 120 is rotated as will be subsequently described in greater detail. The interceptor flapper linkage 120 also includes an integral arm portion 140 extending upwardly from the elongated center portion 122 into engaging contact at point 146 with an integral arm portion 144 extending downwardly from a longitudinal drive link 148 of an actuating assembly shown generally at 142.

The longitudinal drive link 148 is also disposed for rotation relative to the baseblock casting 12 by a pair of spaced apart integral pins 150, 152 extending from the longitudinal drive link in respective journalled relationship with a pair of appropriate bearing surfaces extending from the baseblock 12. The actuating assembly 142 additionally includes an integral arm portion 158 extending upwardly from the elongated drive link 148 and defining a tip portion 162 extending into the area of a linear flash array receiving socket 160.

The interceptor crank assembly 114 is biased for rotation in a counterclockwise direction about the pivot point 116 by a tension spring 164, the moving end of which connects to an integral hook portion 166 which extends backwardly from the elongated center portion 122 of the interceptor flapper linkage 120. The non-moving end of the tension spring 164 is grounded with respect to the baseblock casting 12.

Tension spring 164 also simultaneously operates to bias flapper linkage 120 to rotate interceptor pin 134 out of the locus of travel of walking beam 56 while at the same time biasing the flapper arm portion 140 into continuous engagement with the actuating assembly 142 so as to maintain the tip portion 162 thereof within the socket 160. The lens mount assembly 28 drivingly connects to a radial face cam 168 defining a cam surface 169 concentric with the objective lens 24 optical axis for movement in correspondence with the focus bezel 20. There is additionally included a peripheral flange 171 extending radially outward of the cam surface 169 to provide a light and dust seal.

The radial face cam 168 drivingly engages a rigid adder link 172 at an integral cam follower portion 176 thereof intermediate the ends of the adder link 172. One distal end of the adder link 172 pivotally connects to the interceptor crank assembly 114 at a pivot point 174. The opposite end of the adder link 172 defines a cam portion 178 disposed for simultaneous translation and rotation about a driver pin 180 which is operatively connected to the trim bezel 18 for movement in correspondence therewith in the following manner. As is now readily apparent, tension spring 164 also serves to bias crank arm plate 115 for counterclockwise rotation about pivot point 116 in this manner facilitating continuous engagement between the follower portion 176 of adder link 172 and the cam 168.

Manual adjustment of trim bezel 18 operates through the meshed teeth 108, 110 to rotate the optical trim wedge 100 about its point of pivotal connection at 103 to the trim mounting plate 102 simultaneously rotating drive pin 180 which is in fixed connection thereto. Thus manual adjustment of the trim bezel 18 operates to simultaneously vary light transmission to the photocell while at the same time rotating drive pin 180 about the trim wedge pivot point at 103. The cam portion 108 may be maintained in continuous driving engagement with pin 180 by virtue of an arcuate recess 268 in the lens housing casting 14 which recess receives the outside tip of the drive pin 180 so as to prevent lateral disengagement of the adder link 172 therefrom. There may also be provided a second pin 183 extending from the optical trim wedge 100 in spaced relation with respect to the drive pin 180 and adder link 172.

Figure 2:
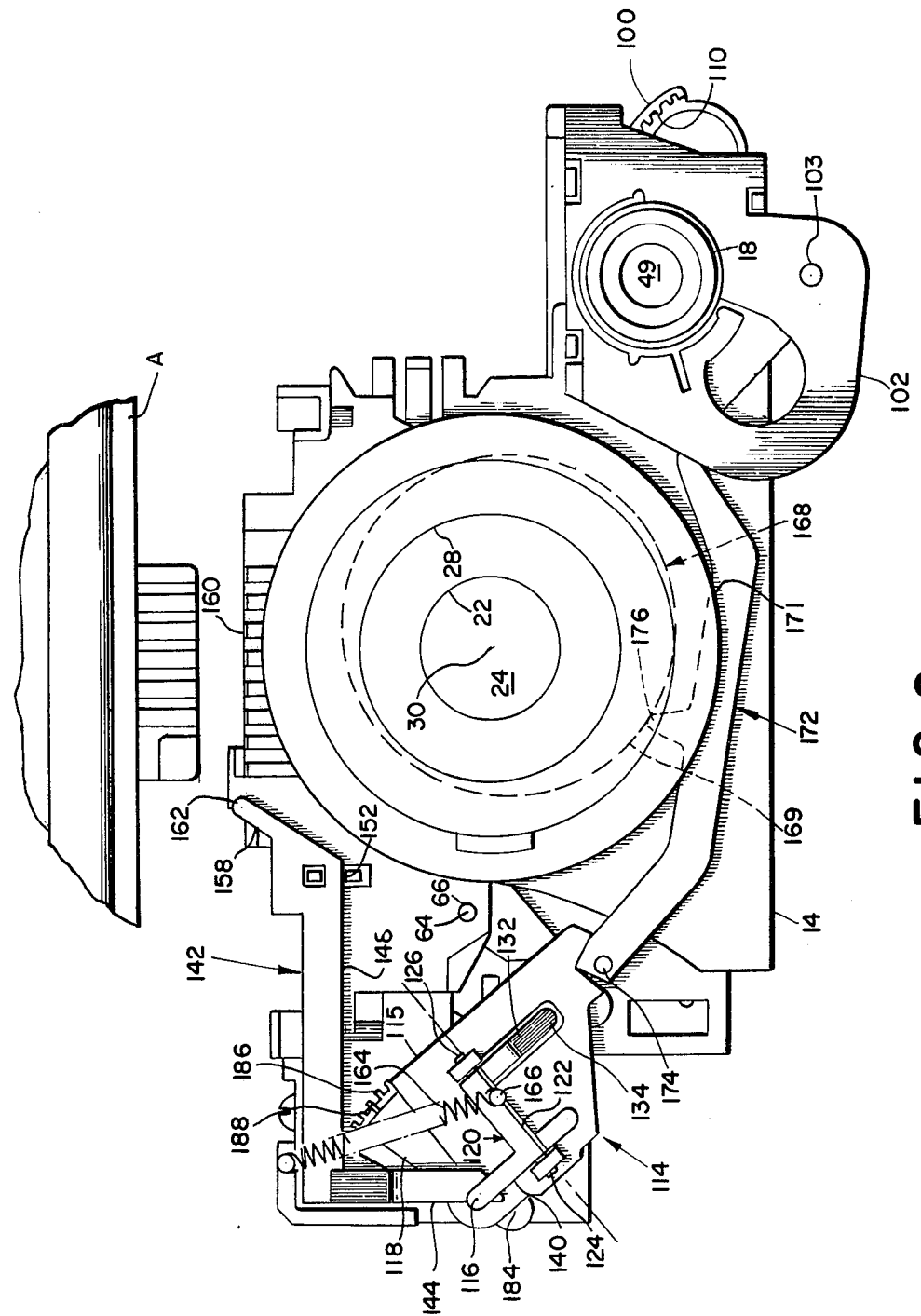
FIG. 2 is a cutaway front view of the exposure control system and trim assembly of FIG. 1.
Figure 3:
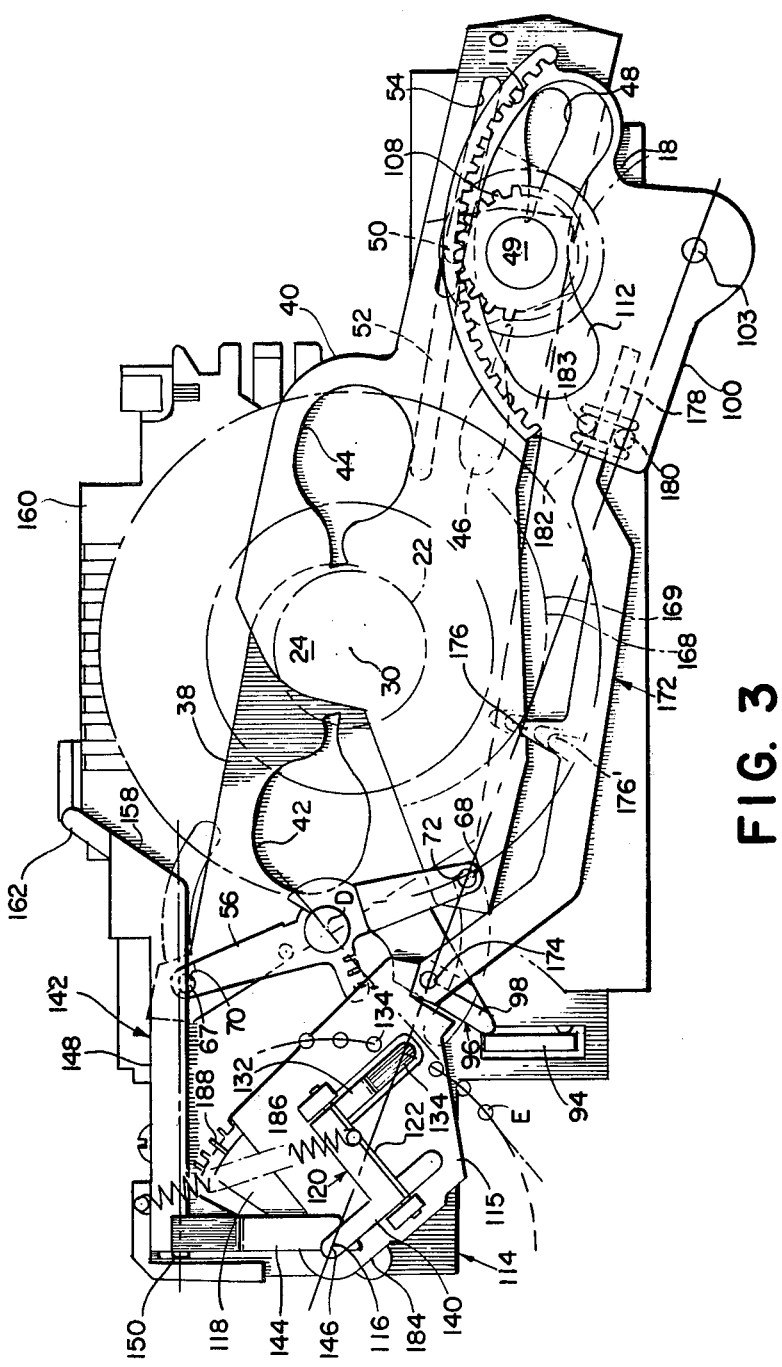
FIG. 3 is a cutaway front view of the exposure control system and trim assembly of FIG. 2.
Figure 4:
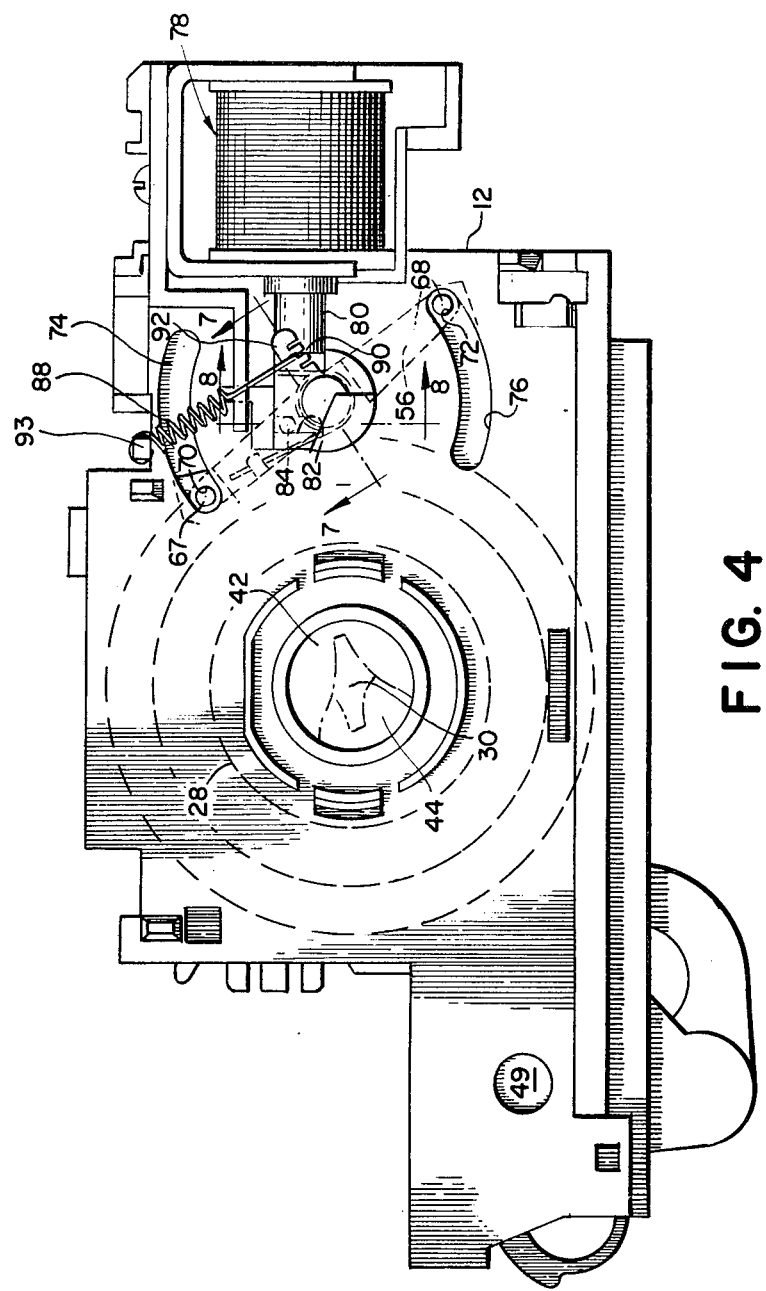
FIG. 4 is a cutaway back view of the exposure control system and trim assembly of FIG. 1.
Figures 5, 6:
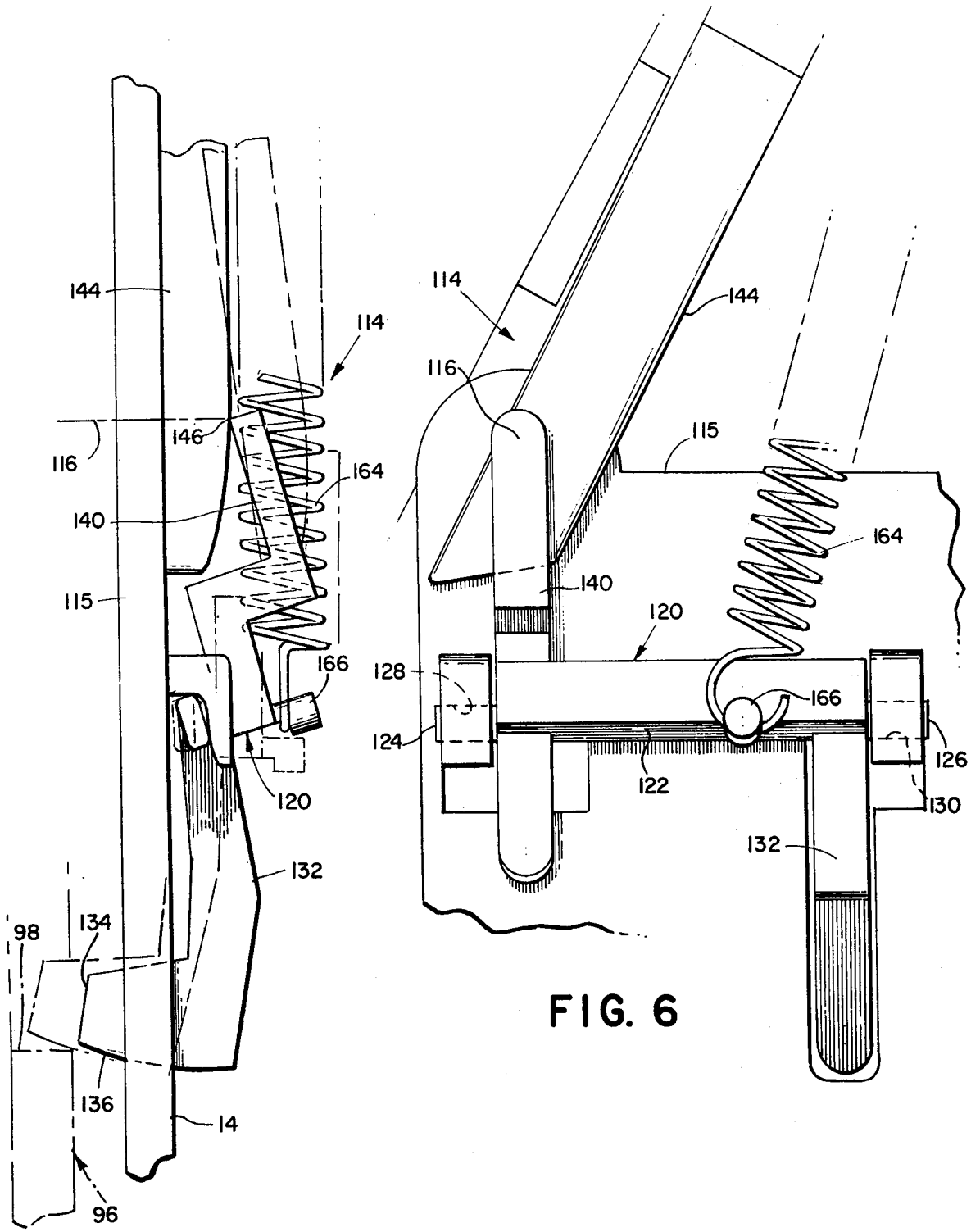
FIG. 5 is an enlarged side view showing a broken away portion of the exposure control system of FIG. 1.
FIG. 6 is an enlarged front view showing a broken away portion of the exposure control system of FIG. 1.
Figure 7:
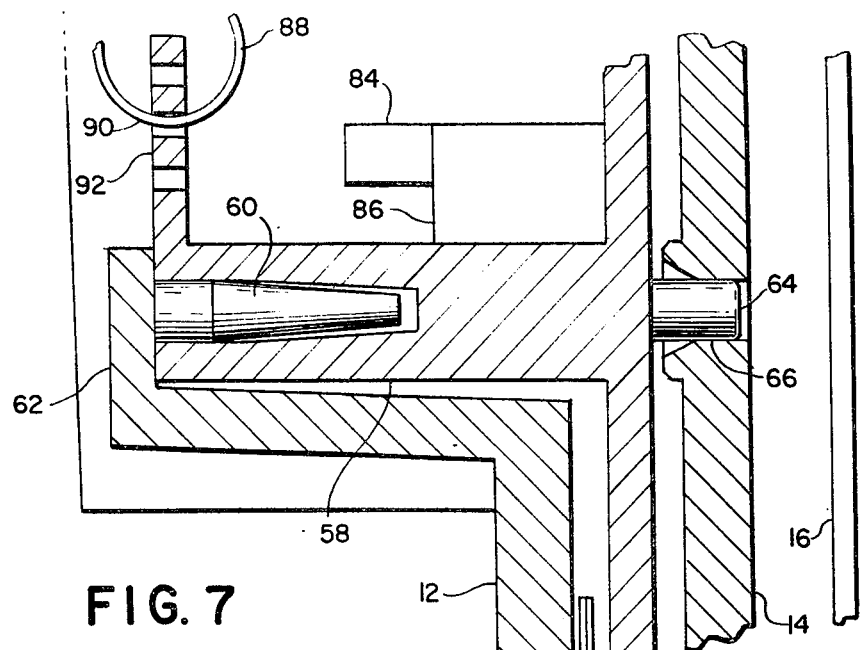
FIG. 7 is a broken away cross-sectional view taken across the lines 7—7 of FIG. 4.
Figure 8:
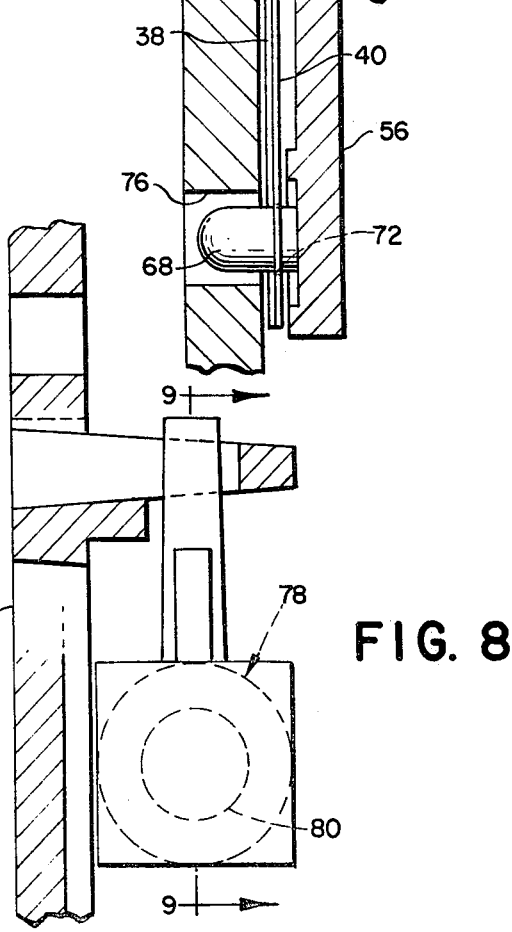
FIG. 8 is a broken away cross-sectional view taken across the lines 8—8 of FIG. 4.
Figure 9:
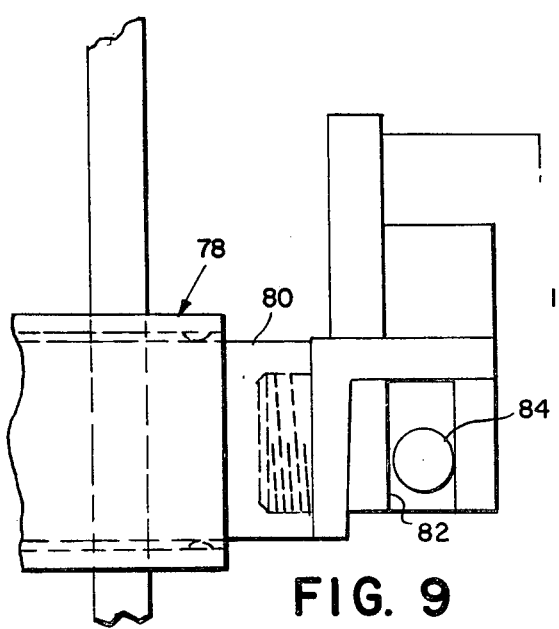
FIG. 9 is a broken away cross-sectional view taken across the lines 9—9 of FIG. 8.

Actuation of the interceptor flapper linkage 120 during the flash mode of operation is provided as follows. Insertion of a conventional linear flash array unit (not shown) into its associated receiving socket 160 operates to engage the tip portion 162 of the actuating assembly 142 so as to rotate the upwardly extending arm portion 158 thereof about the pivot pins 150, 152 and inwardly from the plane of the drawing as illustrated in FIGS. 2 and 3. Rotation of the upwardly extending arm portion 158 in this manner in turn operates to rotate the downwardly extending arm portion 144 outwardly from the plane of the drawing as shown in FIGS. 2 and 3 so as to engage the upwardly extending arm portion 140 of the interceptor flapper linkage 120. The interceptor flapper linkage 120 is thus rotated about the pivot pins 124, 126 against the bias of tension spring 164 such that the interceptor pin 134 and its associated arm portion 132 rotate inwardly from the plane of the drawing as shown in FIGS. 2 and 3 into the locus of travel of the walking beam 56 and its associated integral cam 96 as best shown in FIG. 5.

During the flash mode of operation, the interceptor crank assembly 114 is actuated in the aforementioned manner to move the interceptor pin 134 into the locus of travel of the walking beam 56 and its associated integral cam 96. Once actuated, the interceptor pin 134 is thereafter in position to intercept the cam surface 98 of the walking beam 56 during an exposure interval, which point of interception coincides with a precise aperture value as is determined by the cooperative relation of the aperture blade elements 38 and 40 together with their associated light admitting primary apertures 42 and 44. In this manner, the camera may be adjusted in accordance with the levels of artificial illumination anticipated at the scene to be photographed.

The mechanical and geometric relationship between the radial face cam 168, trim link 172, interceptor crank assembly 114, and interceptor cam 134 are based upon an application and evaluation of the inverse square law of light propagation where the light energy available from a given source is considered to vary inversely with the square of the distance from that source. An analog representation of the light source to subject distance is provided by the radial face cam 168 which moves in correspondence with the focusing bezel 20 to drive the trim link 172 about the drive pin 180 so as to in turn rotate the interceptor crank assembly 114 about the fixed pivot point 116. As is readily apparent, the interceptor pin 134 is also rotated in concert with the interceptor crank assembly 114 so as to vary its location along the walking beam 56 and integral cam 96 locus of travel in accordance with the inverse square law of light energy propagation. In other words, the maximum aperture to which the aperture blade elements 38, 40 may open is directly determined by the focusing system of the camera in conformance with the inverse square law of light energy propagation.

The trim bezel 18 of this invention may also be manually rotated to provide trim adjustment in the following manner. Manual rotation of the trim bezel 18 is imparted to the optical trim wedge 100 by way of the meshed teeth 108, 110. Rotation of the trim wedge 100, in turn, operates to rotate its associated drive pin 180 about the point of pivotal connection at 103 between the trim wedge 100 and mounting plate 102. The rotation of drive pin 180 in turn operates to rotate the adder link 172 about its follower portion 176 so as to pivot the interceptor crank assembly 114 about is associated point of pivot at 116.

In this manner, the interceptor pin 134 may be rotated through its arcuate path in concert with rotation of the trim bezel 18. Accordingly, manual rotation of trim bezel 18 causes the position of interceptor pin 134 to be selectively advanced or retarded in its aperture defining position therewithin and the interceptor assembly 114 can thus be adjusted or trimmed by any select exposure value through a simple manipulation of the trim bezel 18. The trim bezel 18 may be adjusted through either a clockwise or counterclockwise rotation thereof from an intermediate neutral position as shown in FIG. 3. The neutral position should correspond to that position in which the detent 216 engages the slot 218 and thus should be readily identifiable to the touch of a camera operator. As is readily apparent from FIG. 3, full counterclockwise rotation of the trim bezel 18 corresponds to full counterclockwise rotation of the trim wedge 100 and operates to permit the adder link 172 to be rotated by the biasing spring 164 in a clockwise direction about the follower portion 176, thus rotating the interceptor crank assembly 114 and its associated interceptor pin 134 in a counterclockwise direction about the pivot point 116 to define a progressively increasing aperture area. Conversely, the clockwise rotation of the trim bezel 18 corresponds to clockwise rotation of the trim wedge 100 about its associated pivot point 103 and operates to rotate adder link 172 about its follower portion 176 and against the bias of spring 164 in turn rotating interceptor crank assembly 114 and its associated interceptor pin 134 in a clockwise direction about pivot point 116 to define progressively decreasing aperture areas.

As is now readily apparent, an important feature of this adjustment is that a full clockwise or counterclockwise rotation of the trim bezel 18 from its neutral position will always operate to impart a substantially corresponding change in the degrees of rotation of the interceptor pin 134 about the pivot point 116 regardless of the position of focus bezel 20 and its associated radial face cam 168. A predetermined number of degrees rotation of the interceptor pin 134 will in turn correspond to a predetermined number of F/stop changes in the aperture value defined by the scene light admitting primary apertures 42 and 44 regardless of the initial position of the interceptor pin 134. Therefore, the trim adjustment remains substantially uniform regardless of focus and cam 168 adjustment. In other words, rotation of the trim bezel 18 about a preselected number of degrees in either direction from the neutral position will be reflected by a predetermined number of degrees rotation of the interceptor pin 134 about the pivot point 116 thus changing the aperture value by a predetermined number of F/stops regardless of the position of the radial face cam 168 and its associated focus bezel 20. In a preferred mode of operation, it is desirable that a full adjustment of the trim bezel 18 from the neutral position correspond to a one and one half F/stop change in aperture value.

In order to compensate for the cumulative effect of dimensional variations in the individual components of a mass produced commercial camera, there may also be provided an adjusting bar 118 which may be selectively rotated about a fixed pivot point 184 connecting to the baseblock casting 12. Rotation of adjusting bar 118 operates to rotate pivot point 116 about pivot point 184 so as to achieve the precise alignment required for uniform correspondence between the change in aperture value and the change in trim adjustment. The outside end of the adjusting bar 118 may include a detent 188 for selective engagement with a corrugated type scale 186 which defines a plurality of discrete settings with regard to the baseblock casting 12.

It will now be appreciated that adjustment of trim bezel 18 and its associated trim wedge 100 also serves to selectively position a plurality of varying light transmissive sections 112 over the light sensing photocell 270 of the light detecting station 49. Therefore as a consequence, any exposure value inserted as a trim from trim bezel 18 is simultaneously transmitted to the interceptor crank assembly 114 as well as into the light detecting station 49. This arrangement is advantageous in systems of the so-called hybrid type as disclosed in an application for U.S. patent entitled "Automatic Exposure Control System" by G. D. Whiteside and B. K. Johnson, filed Aug. 5, 1974, and assigned in common herewith, where follow focus and light detecting means are used in cooperation with each other during the flashmode of operation.

It should be further appreciated that the various components herein described for the trim assembly of this invention may consist of plastic parts all of which can be economically molded and assembled. In addition, the various components are all designed to snap together and thus may be assembled in a simple and economical manner without the use of extraneous tools or connectors.

Since certain changes may be made in the above described system and apparatus without departing from the scope of the invention herein involved, it is intended that all matter contained in the description thereof or shown in the accompanying drawings shall be interpreted as illustrative and not in a limiting sense.

We claim:
1. An optical trim mechanism for a photographic apparatus of the type having a light responsive exposure control system including scene light sensing means comprising:
   a mounting plate;
   means for fixedly stationing said mounting plate with respect to the photographic apparatus;
   a manually adjustable member disposed for rotation with respect to said mounting plate; and
   a trim member having a light transmissive portion of varying light transmissive characteristics movable in scene light intercepting relation with respect to the scene light sensing means, said trim member being disposed for rotation with respect to said mounting plate while having a portion in engagement by a portion of said manually adjustable member for said manually adjustable member to drive said trim member such that clockwise rotation of said adjustable member results in a corresponding clockwise rotation of said trim member while counterclockwise rotation of said adjustable member results in a corresponding counterclockwise rotation of said trim member, thereby varying the amount of scene light reaching the light sensing means in order to trim the response of the exposure control system with respect to a select amount of scene light.

2. The optical trim mechanism of claim 1 wherein said adjustable member is of hollow cylindrical form, said mounting plate includes a hole therethrough for receipt of said adjustable member and said trim member is disposed for rotation about a point spaced apart from said hole so that rotation of said trim member by said adjustable member operates to rotate the light transmissive portion of said trim member transversely across one open end of said adjustable member to vary the amount of photographic scene light received by the light sensing means from said hollow adjustable member.

3. The optical trim mechanism of claim 2 wherein said mounting plate hole is defined by opposed arcuate portions which are resiliently biased for movement toward each other so as to forcibly engage said adjustable member in a manner operating to brake the rotation of said adjustable member and thereby discourage undesired rotation thereof.

4. The optical trim mechanism of claim 2 wherein said mounting plate hole includes a detent and said adjustable member includes a slot for engagement by the detent in order to permit ready identification of a select position of said adjustable member corresponding with a predetermined output condition for the exposure control system.

5. The optical trim mechanism of claim 2 wherein said mounting plate includes at least two axially spaced apart transverse flange portions extending inwardly from said hole and said adjustable member includes at least one transverse flange portion extending outwardly therefrom for circumferential sliding engagement intermediate said mounting plate flanges.

6. The optical trim mechanism of claim 1 wherein said drivable portion of the trim member includes an arcuate plurality of inwardly extending teeth members and said driving portion of said trim member includes a circumferential plurality of outwardly extending teeth members disposed about the periphery of said trim member in meshed relation with said inwardly extending teeth members.

7. The optical trim mechanism of claim 1 wherein said means for fixedly stationing said mounting plate with respect to the photographic apparatus includes a wall member stationed in fixed relation with respect to the photographic apparatus together with at least two resilient elongated prong members which extend laterally outward from the wall member into engagement with edge portions of said mounting plate.

8. An optical trim mechanism for a photographic apparatus of the type having a light responsive exposure control system including scene light sensing means comprising:
a mounting plate;
means for fixedly stationing said mounting plate with respect to the photographic apparatus;
a manually adjustable member disposed for rotation with respect to said mounting plate; and
a trim member having a light transmissive portion of varying light transmissive characteristics movable in scene light intercepting relation with respect to the scene light sensing means, said trim member being disposed for rotation with respect to said mounting plate while having a portion in drivable engagement by a portion of said manually adjustable member such that clockwise rotation of said adjustable member results in a corresponding clockwise rotation of said trim member while counterclockwise rotation of said trim member, thereby varying the amount of scene light reaching the light sensing means in order to trim the response of the exposure control system with respect to a select amount of scene light, wherein said means for fixedly stationing said mounting plate with respect to the photographic apparatus includes a wall member stationed in fixed relation with respect to the photographic apparatus together with at least two resilient elongated prong members which extend laterally outward from the wall member into engagement with edge portions of said mounting plate and wherein the prong members include respective stud portions extending laterally from the outward tips thereof and wherein said mounting plate includes at least two receiving slots arranged to receive respective prong members wherein the receiving slots respectively include bevelled leading edge portions for respective engagement with the leading edge portions of said stud portions so as to gradually deflect said stud portions upon insertion thereof in a manner operating to bend said resilient prong members; said receiving slots also extending respectively from transverse wall portions which engage the respective sides of stud portions to inhibit the unintentional withdrawal thereof upon full insertion of the resilient prong members within respective slots, said prong members additionally including transverse edge portions spaced apart from said stud portions for engagement with said mounting plate in a manner limiting the insertion of said prong members into said respective receiving slots.

9. A trim mechanism for photographic apparatus of the type having a light responsive exposure control system including scene light sensing means together with a follow focus system responsive to the displacement of a link member comprising:
a mounting plate;
means for fixedly stationing the mounting plate with respect to the photographic apparatus;
a manually adjustable member disposed for rotation with respect to said mounting plate; and
a trim member having a light transmissive portion of varying light transmissive characteristics movable in scene light intercepting relation with respect to the scene light sensing means wherein said trim member also connects to the link member in order to move the link member in correspondence with the light transmissive portion, said trim member being disposed for rotation with respect to said mounting plate while having a portion in engagement by a portion of said manually adjustable member for said manually adjustable member to drive said trim member such that clockwise rotation of said adjustable member results in a corresponding clockwise rotation of said trim member while counterclockwise rotation of said adjustable member results in a corresponding counterclockwise rotation of said trim member thereby simultaneously displacing the link member in order to trim the response of the follow focus system while at the same time varying the amount of scene light reaching the light sensing means in order to correspondingly trim the response of the exposure control system with respect to a select amount of scene light.

10. The trim mechanism of claim 9 wherein said adjustable member is of hollow cylindrical form, said mounting plate includes a hole therethrough for receipt of said adjustable member and said trim member is disposed for rotation about a first point spaced apart from said mounting plate hole, said trim member further engaging the link member at a second point spaced apart from said first point and mounting plate hole so that rotation of said trim member by said adjustable member operates to rotate the light transmissive portion of said trim member transversely across one open end of said adjustable member to vary the amount of photographic scene light received by the light sensing means from said hollow adjustable member while at the same time also rotating said second point about said first point to displace the link member.

11. The trim mechanism of claim 9 wherein said mounting plate is defined by opposed arcuate portions which are resiliently biased for movement toward each other so as to forcibly engage said adjustable member in a manner operating to brake the rotation of said adjustable member and thereby discourage the accidental rotation thereof.

12. The trim mechanism of claim 10 wherein said mounting plate hole includes a detent and said adjustable member includes a slot for engagement by the detent in order to permit ready identification of a select position of said adjustable member corresponding with a predetermined output condition for the exposure control system.

13. The trim mechanism of claim 10 wherein said mounting plate includes at least two axially spaced apart transverse flange portions extending inwardly from said hole and said adjustable member includes at least one transverse flange portion extending outwardly therefrom into circumferential sliding engagement intermediate said mounting plate flanges.

14. The trim mechanism of claim 9 wherein said drivable portion of said trim member includes an arcuate plurality of inwardly extending teeth member and said driving portion of said trim member includes a circumferential plurality of outwardly extending teeth members disposed about the periphery of said trim member in meshed relation with said inwardly extending teeth members.

15. The trim mechanism of claim 9 wherein the point of engagement between the trim member and link member is defined by a pin extending laterally outward of said trim member into engagement with an edge portion of the link member.

16. The trim mechanism of claim 9 wherein said means for fixedly stationing said mounting plate with respect to the photographic apparatus includes a wall member stationed in fixed relation with respect to the photographic apparatus together with at least two resilient elongated prong members which extend laterally outward from the wall member into engagement with respective edge portions of said mounting plate, said wall member further defining an arcuate recess for receipt of the pin extending from said trim member thereby inhibiting lateral disengagement of the link member from said pin.

17. An optical mechanism for photographic apparatus of the type having a light responsive exposure control system including scene light sensing means together with a follow focus system responsive to the displacement of a link member comprising:
   a mounting plate;
   means for fixedly stationing the mounting plate with respect to the photographic apparatus;
   a manually adjustable member disposed for rotation with respect to said mounting plate; and
   a trim member having a light transmissive portion of varying light transmissive characteristics movable in scene light intercepting relation with respect to the scene light sensing means wherein said trim member also connects to the link member in order to move the link member in correspondence with the light transmissive portion, said trim member being disposed for rotation with respect to said mounting plate while having a portion in drivable engagement by a portion of said manually adjustable member such that clockwise rotation of said adjustable member results in a corresponding clockwise rotation of said trim member while counterclockwise rotation of said adjustable member results in a corresponding counterclockwise rotation of said trim member thereby simultaneously displacing the link member in order to trim the response of the follow focus system while at the same time varying the amount of scene light reaching the light sensing means in order to correspondingly trim the response of the exposure control system with respect to a select amount of scene light wherein said means for fixedly stationing said mounting plate with respect to the photographic apparatus includes a wall member stationed in fixed relation with respect to the photographic apparatus together with at least two resilient elongated prong members which extend laterally outward from the wall member into engagement with respective edge portions of said mounting plate, said wall member further defining an arcuate recess for receipt of the pin extending from said trim member thereby inhibiting lateral disengagement of the link member from said pin and wherein the prong members include respective stud portions extending laterally from the outward tips thereof and wherein the mounting plate includes at least two receiving slots arranged to receive respective prong members wherein the receiving slots respectively include bevelled leading edge portions for respective engagement with the leading edge portions of said stud portions so as to gradually deflect said stud portions upon insertion thereof in a manner operating to bend said resilient prong members; said receiving slots also extending respectively from transverse wall portions which engage the respective sides of said stud portions to inhibit the unintentional withdrawal thereof upon full insertion of the resilient prong members within their respective slots, said prongs additionally including transverse edge portions spaced apart from said stud portions for engagement with said mounting plate in a manner limiting the insertion of said prongs into said respective receiving slots.

18. An optical trim mechanism for photographic apparatus of the type having a light responsive exposure control system including scene light sensing means comprising:
   a manually adjustable member having a circumferential portion suitable for rotation;
   a mounting plate having a hole therethrough for receipt of the circumferential portion of said adjustable member wherein said mounting plate hole is defined by opposed arcuate portions which are resiliently biased for movement toward each other so as to forcibly engage the circumferential portion of said adjustable member in a manner operating to brake rotation of said adjustable member and thereby discourage undesired rotation thereof; and
   a trim member having a light transmissive portion of varying light transmissive characteristics for movement in scene light intercepting relation with respect to the scene light sensing means, said trim member being disposed for movement with respect to said mounting plate while having a portion in engagement by a portion of said manually adjustable member for said manually adjustable member to drive said trim member in order to vary the amount of scene light reaching the light sensing means and thereby trim the responce of the exposure control system with respect to a select amount of scene light.

19. The optical trim mechanism of claim 18 wherein said mounting plate hole includes a detent and said adjustable member includes a slot for engagement by the detent in order to permit ready identification of a select position of said adjustable member corresponding with a predetermined output condition for the exposure control system.

20. The optical trim mechanism of claim 18 wherein said mounting plate includes at least two axially spaced apart transverse flange portions extending inwardly from said hole and said adjustable member includes at least one transverse flange portion extending outwardly therefrom for circumferential sliding engagement intermediate said mounting plate flanges.

* * * * *